F. ALLAN.
BOLT, RIVET, AND THE LIKE.
APPLICATION FILED SEPT. 8, 1921.
1,400,401.
Patented Dec. 13, 1921.
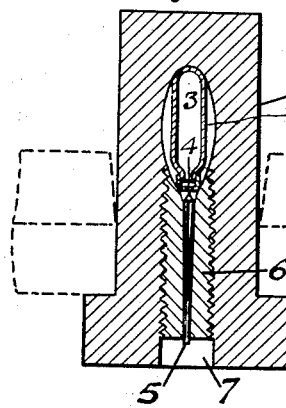
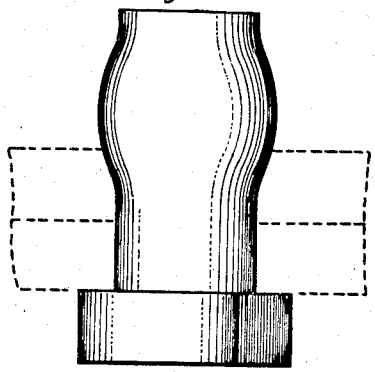
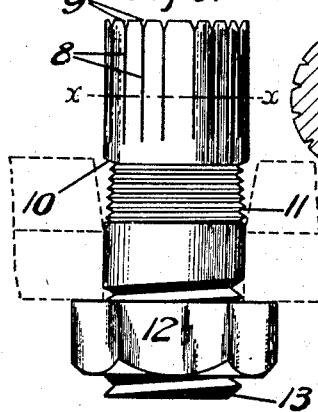
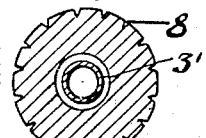
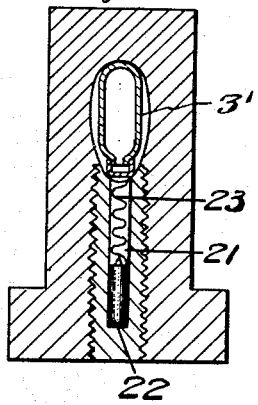
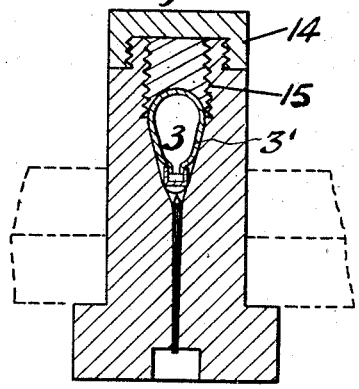
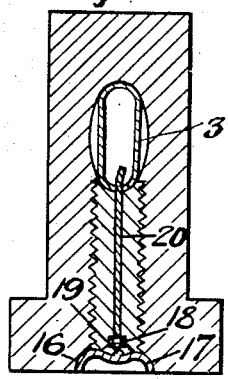
Frank Allan, Inventor
By *[signature]* Attorney

UNITED STATES PATENT OFFICE.

FRANK ALLAN, OF BARROW-IN-FURNESS, ENGLAND.

BOLT, RIVET, AND THE LIKE.

1,400,401.  Specification of Letters Patent.  Patented Dec. 13, 1921.

Application filed September 8, 1921. Serial No. 499,335.

*To all whom it may concern:*

Be it known that I, FRANK ALLAN, a subject of the King of Great Britain, residing in Barrow-in-Furness, England, have invented certain new and useful Improvements in and Relating to Bolts, Rivets, and the like, (for which I have applied for a patent in Great Britain dated the 27th September, 1920, Serial No. 21,590 of 1921,) of which the following is a specification.

The invention relates to a means of expanding or splitting the shank or point of a bolt, rivet or the like by expanding or exploding expansive or explosive chemicals in an internal chamber in the said shank or point, with the object of effecting connections to steel plates and the like. The invention is especially applicable to making connections to steel plates and the like where access to the back of the plate is difficult or impossible, a particular case being under water in ship salvage, though the invention is also applicable to above water work.

The bolts or rivets can be inserted into holes by hand and the explosives detonated or fired by any suitable means. They may also be adapted for use in an explosive punching instrument.

For ordinary use the bolt or rivet is preferably made of ductile steel but when used as a punch, the point is hardened, the hardening being reduced toward the head.

A rivet or bolt may be of any ordinary external shape, and may have a convex, flat or concave point, also the shank may be parallel or tapered.

To facilitate expansion, longitudinal cuts or serrations may be formed on the outer surface substantially parallel to the axis of the explosion chamber. They may also be formed radially on the point.

To assist the grip against withdrawal when expanded in a hole in a steel plate or the like a shoulder may be provided, by forming a circumferential angular recess on the outer surface of the bolt or rivet such that, when expansion takes place, the shoulder projects slightly over the surface of the plate.

To further assist the grip on the sides of the hole after expansion, circumferential serrations are cut in that part of the surface of the bolt or rivet which would come in contact with the wall of the hole in the plate. These serrations preferably should be sharp and hardened so that when expansion takes place they may cut into and embed themselves in the wall of the hole. They may be provided independently of, or in conjunction with, the angular recess.

The explosive chamber is preferably slightly oval, or pear shaped. Its longitudinal position is determined by the type of point required, or by the purpose of the bolt or rivet.

Though only bolts or rivets having a head at one end and an explosive chamber at the other end are described and referred to, I do not confine myself to such cases since in some cases it may be desirable to provide an explosive chamber in the head of the bolt or rivet, so that the bolt or rivet will have a chamber at both ends which may be detonated simultaneously by a communicating channel or independently.

Further, the head end of a bolt may be threaded to receive a nut for adjustment purposes.

The explosive is preferably contained in a metal cartridge case, which in addition to facilitating charging of the chamber, seals any slight crack which may develop in the early stages of expansion and retains the gas of explosion within the chamber for a longer period and until a certain expansion has been obtained, the metal case being more ductile and less liable to split than the walls of the chamber.

Access to, and sealing of, the chamber may be effected from either end, but preferably is had from the head end, for the reason that expansion takes place in the plugged continuation of the chamber until prevented by the wall of the hole through which the bolt or rivet is inserted, thus effecting a wedgelike grip on the wall of the hole and tending to tighten the plate against the head.

When access to the chamber is had from the point end, the point may be reinforced by a screwed cap which may be of hardened or specially toughened steel.

The explosive chamber may be situated at varying positions in relation to the point, according to whether it is desired to split the point open, or to expand the shank in the form of a bulge, with or without longitudinal cracks.

The access plug may be sealed against the escape of gas by the cartridge case, by the use of washers, or by providing the plug with a recessed end in such way that the thin edges press outward against the walls of the access hole when subjected to the pressure of explosion.

Detonation may be by any ordinary and suitable means such as electrical, by firing pin, or by fuse. For ordinary use the firing pin is preferable, the pin being in direct communication with the cap and only requires a slight blow by hand. A recess is made in the head or plug to receive the pin so that the projecting end of the pin may be below the outer surface of the head and thus be protected against a premature blow. A plug may be fitted in the recess for additional protection before use. In order that the pin may not be blown back, it is tapered to fit a tapered portion of the firing pin hole.

It is obvious that several projections or points on a common head, such as a steel block or plate, may likewise be provided with exposive chambers so as to expand or split after being driven through another plate or the like.

The invention also comprises the features which are hereinafter described.

The invention is illustrated by way of example in the accompanying drawings, in which:—

Figure 1 is a section through the center of a bolt having an explosive chamber formed therein.

Fig. 2 is a side elevation of the bolt, illustrating the expansion produced by the explosion.

Fig. 3 is a side elevation of a modified form of my invention.

Fig. 3ª is a sectional view on the line X—X of Fig. 3.

Fig. 4 is a central sectional view of another modified form of the invention, illustrating a bolt having an explosive chamber, access to which may be gained from the point end of the bolt.

Fig. 5 is a central sectional view of a bolt, showing a means of detonating the charge when the bolt is used as a punch and is required to expand immediately after penetration.

Fig. 6 is a sectional view of a bolt employing a firing device of modified form.

As shown in Fig. 1, the bolt 2 contains an explosive in a central chamber. The chamber 3 is of a size to contain the requisite amount of explosive, which is preferably contained in a ductile metal case 3′ of the same shape as the chamber. The cartridge contains a cap 4 which may be fired or detonated by any suitable means; that shown in this case being a firing pin 5. The firing pin hole is slightly tapered where it enters the chamber and the pin is tapered to fit it. The screwed plug 6 which contains the firing pin, seals the entrance to the chamber 3. The plug 6 preferably is shorter than the length of the recess into which it is fitted so as to form a recess 7 in the head end of the bolt or rivet when said plug is in position. The recess 7 thus formed serves to protect the pin from a premature blow, and may be filled with a protecting plug. In use, the pin 5 is given a slight blow to detonate the cap 4 and thus explode or fire the explosive which expands the bolt as illustrated in Fig. 2, or, if desired, and according to the amount of explosive used, the expansion may continue until splitting occurs.

Longitudinal cuts 8 are made in the bolt shown in Fig. 3 to assist expansion or splitting and these cuts may be of varying depth and extent. Similar cuts 9 may be made radially across the end. A portion of the circumference of the shank of the bolt or rivet may be cut away as at 10 to form a shoulder to be effective when the bolt is expanded. Sharp circumferential serrations 11 may be formed in such cut away portion and which, when the bolt expands, obtain a grip on the sides of the hole into which the bolt is inserted. The head end of the bolt may be threaded as at 13 to receive a nut 12 for the purpose of adjustment.

Fig. 4, as specified above, shows a modified form of construction, wherein the entrance to the chamber 3 is at the point end of the bolt or rivet. The end of the bolt or rivet may be threaded to receive a cover plate 14 to assist in the retention of the plug 15.

Fig. 5 shows a further means of detonating the charge, a piece of copper or other suitable metal 17 having a hard point 19 on its inner surface is pressed into the recess 16. A small recess 18 in the plug contains a sensitive cap and communicates with the explosive chamber through a narrow channel 20 which contains a time fuse. On an explosion striking the head of the bolt, the point 19 is pressed in, striking the cap and igniting the fuse.

A further method of detonating the charge is shown in Fig. 6. A channel 21 is cut in the sealing plug and a pointed striker 22 is fitted to slide in said channel. The striker is retained in position by a light spring 23 interposed between it and the cap. In use the striker flies forward and strikes the cartridge cap when the bolt or rivet comes suddenly to rest after penetrating a plate.

Having thus described the nature of the said invention and the best means I know of carrying the same into practical effect, I claim:—

1. A fastening means comprising a body having a chamber containing an expansive charge and means for initiating the expansion of said expansive charge, said body being expansible by the expansion of the expansive charge contained therein.

2. A rivet having a chamber formed therein adapted to contain a charge of explosive material, and means for detonating the charge.

3. A rivet having a chamber formed therein, an explosive charge in said chamber, a sensitive detonating cap associated with said charge, and means for firing said cap.

4. A rivet or the like having a chamber formed therein, a cartridge case in said chamber containing an explosive charge, and means for detonating said charge.

5. A rivet, provided with a shank having a chamber formed therein, a ductile metal case in said chamber containing an explosive charge, and a sensitive detonating cap for said case.

6. A rivet provided with a shank having a chamber formed therein, an explosive charge in said chamber and means for exploding said charge to cause expansion of the shank for rendering said rivet fast in proper position.

7. A rivet provided with a shank having a chamber formed therein near the point end, and an explosive charge in said chamber adapted upon detonation to bulge the shank outwardly in the vicinity of said chamber.

8. A rivet provided with a shank having cuts in the outer surface thereof, and a chamber formed therein adapted to contain an expansive charge.

9. A rivet provided with a shank having a cut away portion forming a circumferential shoulder on the outer face thereof, and a chamber formed therein adapted to contain an explosive charge.

10. A rivet provided with a shank having circumferential serrations, and a chamber formed therein adapted to contain an explosive charge.

11. A rivet provided with a shank having a chamber formed therein adapted to contain an explosive charge, threads on the head end thereof, and a nut engaging said threads and forming an adjustable head for said shank.

12. The method of riveting or bolting plates, which consists in inserting a rivet through the plates and detonating an explosive charge within the rivet to cause an enlargement at the point end thereof.

13. The method of riveting or bolting which consists in placing a rivet in proper position and causing the expansion of an expansive charge within said rivet to cause an enlargement of a portion thereof.

In testimony whereof I have signed my name to this specification.

FRANK ALLAN.